July 28, 1970 M. J. COPLAN ET AL 3,522,341
PREPARATION OF HIGH TENACITY POLYVINYL FLUORIDE STRUCTURES
Filed May 4, 1964

INVENTORS
MYRON J. COPLAN
HOWARD I. FREEMAN
JOSEPH S. PANTO
BY
Gerard P. Rooney
ATTORNEY United States Patent Office 3,522,341
Patented July 28, 1970

3,522,341
PREPARATION OF HIGH TENACITY POLYVINYL
FLUORIDE STRUCTURES
Myron J. Coplan, Natick, Howard I. Freeman, Sharon, and Joseph S. Panto, Dover, Mass., assignors to Diamond Shamrock Corporation, Cleveland, Ohio, a corporation of Delaware
Filed May 4, 1964, Ser. No. 364,731
Int. Cl. D01d 5/12; D01f 3/10
U.S. Cl. 264—210                    7 Claims

ABSTRACT OF THE DISCLOSURE

Polyvinyl fluoride structures exhibiting a high degree of tenacity are produced by extruding a dispersion of polyvinyl fluoride in a latent solvent therefor and rapidly quenching the extruded and coalesced polyvinyl fluoride structure in order to prevent any significant molecular orientation of the extruded structure. Following this quenching operation, a sufficient quantity of the latent solvent is removed from the extruded structure to allow the structure to be drawn with a sharp neck. Finally, after the drawing stage, the drawn structure is heat set to remove the remaining latent solvent and provide a structure having the desired degree of strength This invention relates to a process for the preparation of extruded structures from synthetic polymers and to the structures formed thereby. Specifically, the present invention pertains to an improved process for the preparation of polyvinyl fluoride extruded structures, i.e., filaments, fibers and films and to such materials per se.

Three processes conventionally used for the manufacture of extruded structures are generally referred to as wet, dry, and melt extrusion techniques. In each of these processes the basic method is the same. This comprises converting the solid polymer to a fluid state, extruding it through an orifice and thereafter converting the polymer to a solid possessing the desired shape. In the wet and dry extrusion processes this fluid state is achieved by dissolving the polymer in a suitable solvent. In the melt extrusion process the polymer is melted by heating it to a temperature above its melting point. Unfortunately, however, polyvinyl fluoride is insoluble in commonly used volatile solvents and upon heating deteriorates prior to reaching the high temperatures generally involved in the preparation of the solutions and melts for extrusion.

In recent years, a method for preparing extruded structures eliminating the necessity of either dissolving or melting the polymer prior to extrusion has been developed. This method involves dispersing the polymer in the form of discrete particles in a suitable liquid and extruding through a suitable orifice to form the desired article. The polymer is dispersed in a liquid medium which has substantially no solvent action on the polymer at room temperature but which is capable at elevated temperatures of coalescing the polymer particles. The extruded structures produced by this method may be subjected to other suitable treatments, such as drawing or stretching or if the structure is a fiber to a staple fiber cutter. Extruded structures of polyvinyl fluoride produced by this method have been found to possess a tenacity of up to about 2 grams per denier.

It has now been found that extruded structures of a vinyl fluoride polymer can be produced possessing tenacities substantially greater than previously prepared by the method of the present invention. Vinyl fluoride polymer extruded structures possessing high tensile strength are prepared by a method comprising the steps of removing sufficient latent solvent from the extrudate while it is in a state of minimum molecular orientation so as to draw the extrudate with a sharp neck, drawing the extrudate in an initial stage of drawing with a sharp neck and setting the drawn structure.

Figure 1:
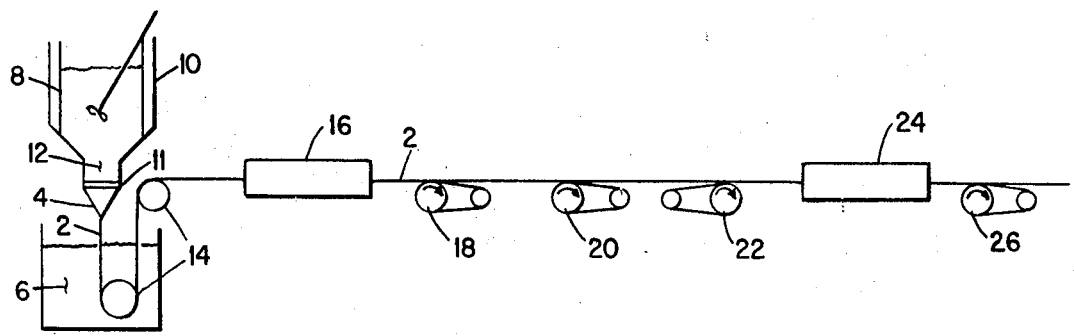
Figure 2:
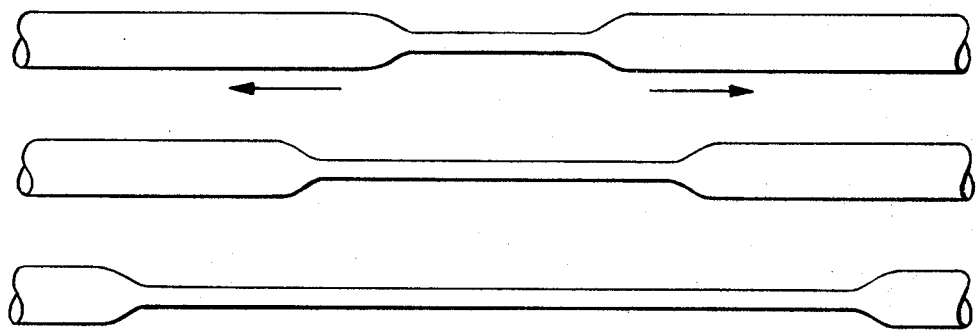

Referring now to the accompanying drawing:

FIG. 1 is a diagrammatic representation of one arrangement of equipment to produce the high tenacity extruded structures of the present invention; and FIG. 2 is a schematic representation in cross-section of an extruded structure drawing with a sharp neck.

The term "latent solvent" as used hereinafter in the specification and claims is defined as an organic liquid having a boiling point above 100° C., at atmospheric pressure and having no significant solvent or swelling action on polyvinyl fluoride at room temperature, but being capable at elevated temperature below its normal boiling point of solvent action sufficient to cause polyvinyl fluoride particles to coalesce.

The term "sharp neck" is defined as that point in the extruded structure where shoulders or necks develop under drawing tension where the drawn material joins the thicker undrawn part and the thickness of the drawn portion remains constant (FIG. 2). The full extension is called the "natural draw ratio." The "draw ratio," a value commonly used to express the extent of drawing, is obtained by dividing the stretched length of the extrudate by its original length.

In attempting to produce high tenacity extruded structures from a vinyl fluoride polymer, it has been found that high tenacity extruded structures, i.e., having tensile strengths greater than about 3 grams per denier, preferably greater than 5 grams per denier, could not be produced using the usual and known method which comprises passing the dispersion of a vinyl fluoride polymer and latent solvent through an extrusion head, e.g., a spinneret or casting hopper, either into a heated tube or through a finishing bath followed by a drawing or stretching of the extrudate as exemplified by U.S. Pat. Nos. 2,405,008; 2,810,702; 2,824,780; 2,953,818; 3,000,843; 3,000,844, and 3,081,208. It has now been found in contrast to teachings of these methods that if sufficient latent solvent is removed from the extrudate while the extrudate is in a state of minimum molecular orientation to allow drawing with a sharp neck high tenacity extruded structures can be prepared by the steps described below. High tenacity extruded vinyl fluoride polymer structures are prepared by sequentially collecting the extrudate as it is emitted from the extrusion orifice in such a manner that the extrudate is recovered with a minimum molecular orientation while it is still in a highly deformable state, removing sufficient latent solvent from the undrawn, un-oriented extrudate that the extrudate draws with a sharp neck upon initial drawing, drawing the extrudate with a sharp neck and setting the drawn extrudate. By this process extruded vinyl fluoride polymer structures can be obtained possessing tensile strengths of up to about 10 or more grams per denier.

The orientation of the molecular structures of the extruded vinyl fluoride polymer structure, while it is in a highly deformable state, has been found to be an important factor in preparing the high tenacity extruded vinyl fluoride polymer structures of the present invention. As the extruded structure of vinyl fluoride polymer emerges from the extrusion orifice there is inevitably the formation of tension applied to the extrudate. This tension may be due only to the effect of gravity or the result of drawing the extrudate away from the orifice with positively driven rollers. Depending upon the degree of tension imposed on the extrudate, there may be a variable amount of stretching developed resulting in varying degrees of molecular orientation. The production of high tenacity extruded vinyl fluoride polymer structures is accomplished by preventing the extrudate from achieving any appreciable molecular orientation while it remains in a highly deformable state before sufficient latent solvent is removed therefrom to allow the extrudate in an initial stage of drawing to draw with a sharp neck.

Molecular orientation of the extrudate may be determined at various distances from the extrusion orifice by collecting specimens of the extrudate and deriving the birefringence of the extrudate at these distances. Birefringence is a measure of the degree of orientation of the chain structure of the extrudate and is determined by measuring the refractive indices of the structure parallel to the molecular chain and perpendicular to the molecular chain. Birefringence will depend on the differences of the refractive index and will be zero if the indices are the same. If the refractive index is greater either for light vibrating parallel to the molecular chain or perpendicular to the chain, orientation of the molecules in the structure is indicated and results in a measure of orientation. Thus, for any given vinyl fluoride-polymer-latent solvent system, the exact distance from the extrusion orifice where the isotropic form of the vinyl fluoride polymer, where no birefringence is observed, easily can be determined and the extrudate may be collected prior to any significant orientation of the molecular chain which affects the tenacity of the final extruded structure.

Once this point of minimum birefringence for a given vinyl fluoride polymer system has been determined, the tension load on the extrudate may be relieved by quenching employing a variety of methods. For instance, the vinyl fluoride polymer system may be extruded into a quench bath placed at a distance from the extrusion orifice such that a minimum orientation of the molecular chain of the vinyl fluoride polymer extrudate is achieved. The distance between the extrusion orifice face and the surface of the quench liquid may vary from a few inches up to 2 or even 5 or more feet depending on such variables as the molecular weight of the vinyl fluoride polymer employed, the viscosity of the vinyl fluoride polymer-latent solvent fluid composition, and the like. In this way the extrudate is supported by the quenching liquid requiring the extruded structure to bear only a very slight tension load, if any. The quench liquid serves both to solidify the extrudate structure and support the weak, freshly extruded structure while it is still in a highly deformable state. This avoids molecular orientation by tensile forces on a still semi-molten polymer-latent solvent extrudate before the extrudate has had time to solidify. After solidification no further molecular orientation is achieved unless the extrudate is subjected to further stresses such as those encountered in the drawing stage.

If the situation requires, the extrusion of the vinyl fluoride polymer-latent solvent mixture may be conducted by placing the extrusion orifice directly into the quench bath liquid so that as the extrudate emerges from the orifice its weight is carried by the quench liquid and thereby effect the least possible tension load on the extrudate. If a liquid quench system is employed the liquid system serving as the quench liquid should not react chemically with the vinyl flouride polymer at the quench bath temperature. Also, it should have a boiling point sufficiently high so that it will not boil off as freshly extruded coalesced structure enters the bath. Such liqiud systems include water, sodium chloride and calcium chloride brines, latent solvents for vinyl fluoride polymers and mixtures of latent solvents and water. The quench bath should be maintained at a temperature sufficiently low to effect rapid cooling of the freshly extruded structure. In general the quench bath should be maintained at a temperature below about 100° C.

Alternatively, the vinyl fluoride polymer system may be extruded into air and before the molecular chain in the extrudate has had time to be oriented due to its tension load, the extrudate structure is quenched by air currents directed against the extrudate's surface solidfy-ing the structure. Heated air may be used not only to solidify the extrudate but remove latent solvent therefrom. Examples of such quench methods are the "in-flow quench" method wherein air is directed into the openings of a circular perforated shield through which the extrudate passes; the "out-flow quench" method is the same as in the "in-flow" method except that the air flows out from a perforated shield to solidify the structure as it passes; and the "hot-stack" method wherein hot gasses are forced within a column through which the extrudate passes. The choice of the particular procedure for quenching the vinyl fluoride polymer-latent solvent extrudate in a state of minimum orientation of the molecular chain will be obvious to those skilled in the art.

The quenched extrudate which has a minimum orientation of its molecular chain is then treated to remove sufficient latent solvent from the structure to permit drawing with a sharp neck when the extrudate is subsequently drawn in an initial drawing stage. The removal of sufficient solvent from the extrudate to permit it to draw with a sharp neck in the subsequent drawing operation may be achieved by a heat treatment step conducted at a temperature just below the boiling point of the latent solvent to avoid any bubbling while the solvent is being removed from the extrudate. This heat treatment is conducted preferably at a temperature sufficient to remove essentially all of the latent solvent in the extrudate. If any appreciable amount of solvent remains in the extruded structure during the drawing step, sharp necking as illustrated by FIG. 2 does not occur.

The particular temperature at which the solvent is removed from the unoriented extrudate will depend upon the boiling point of the latent solvent employed. Also, the severity of the heating step must not be such that the vinyl fluoride polymer structure deteriorates as a result of either the high temperature employed or length of the heat treatment. In general, the heat treatment is not conducted in excess of 190° C., and preferably in the range of about 120° to 170° C. The length of time the extrudate is subjected to the heat treatment depends on the amount of solvent originally present in the dispersion, the particular solvent used and the temperatures employed. Heating may proceed for a few minutes up to about 5 or more hours; preferably, however, the initial heat treatment step is conducted for a period of time of from about 15 minutes up to about 2 hours with an especially preferred length of time of up to about ½ hour. Various heating techniques may be employed. As mentioned above the solvent may be removed by using hot air currents as the extrudate is emitted from the extrusion orifice which serves to both solidify the extrudate and remove the latent solvent therefrom. If a quench bath is employed an electrical heating coil can be placed adjacent to the extrudate as it is removed from the quench bath or the extrudate passes to a hot air oven wherein the solvent is removed. Alternatively, a vacuum oven may be employed where lower temperatures may be utilized. No matter what solvent removal technique is employed, sufficient latent solvent has to be removed from the extruded vinyl fluoride polymer structure that the extrudate draws with a sharp neck upon an initial drawing.

The next step after the removal of the latent solvent from the extrudate is the initial drawing or stretching of the extruded structure with a sharp neck. In the case of fibers and filaments, orientation of the molecular structure is generally achieved by stretching in a direction parallel to the fiber or filament axis, whereas the molecular structure of films is oriented by stretching biaxially, i.e., in two mutually perpendicular directions.

After sufficient latent solvent has been removed from the vinyl fluoride polymer structure to allow drawing with a sharp neck, the structure is drawn or stretched at a temperature sufficient to allow drawing with a sharp neck. Generally, the temperature at which drawing of the structure can be conducted may be maintained within a temperature range of about 50° to 190° C., preferably temperatures within the range of about 100° to 175° C. are employed. Heating means such as a hot pin, hot plate, hot oil bath, and the like may be employed to maintain the drawing temperature. The drawing can be conducted between two godets, rolls, or thread-advancing reels. The second godet, roll or thread-advancing reel is operated at a faster peripheral speed than the first godet, roll or thread-advancing reel in proportion to the extent of draw or stretch desired. In the operation of the present invention, the second godet, roll or thread-advancing reel is operated at a peripheral speed such that the vinyl fluoride polymer structure is stretched with a sharp neck having a draw ratio of up to about 12-fold. The draw ratio should be at least 5, and preferably at least 7-fold. The structures emerging from the drawing or stretching step possess tensile strengths in the order of at least about 3 grams per denier.

After the vinyl fluoride polymer structure is drawn with a sharp neck, it may then be subjected to a setting operation wherein it is believed that the last trace of residual solvent is removed and the orientation of the molecular chain is locked in place by the reinforcing effect of crystallization. Setting may be accomplished by heating the stretched structure to temperatures sufficient to build up a stress which will relax as far as possible due to the enhanced degree of molecular flexibility at high temperatures. The stress does not relax to zero, but it goes far enough to decrease greatly the subsequent free shrinkage of the extruded structure. The temperature during setting is maintained sufficiently high to promote crystallization. Generally, the heat setting temperature is maintained between about 150° C. to about 190° C., preferably about 160° to 180° C. The extruded structure may be subjected to this heat setting temperature for a relatively short period of time, i.e., for about 1 to 10 minutes, preferably 2 to 8 minutes provided that there is crystallization produced during this period. The severity of this heating is to be regulated so that no undue decomposition or deterioration of the vinyl fluoride polymer occurs.

Vinyl fluoride polymer structures of intermediate tensile strengths may be attained by varying the tension under which the stretched structure is held during the setting step. For instance, the 5 grams per denier polyvinyl fluoride structure of Example VIII, described below, when held under tension while subjected to heat setting at 175° C. emerges from the heat setting step posessing a tensile strength in the order of 10 grams per denier. If the stretched structure is allowed to relax, i.e., not held under tension during the heat setting step, the emerging polyvinyl fluoride structure possesses a tensile strength intermediate between that of the drawn unset structure and drawn structure heat set under tension (Example VIII). For instance, in Example IX the drawn polyvinyl fluoride structure is heat set while in a relaxed state and the resulting tensile strength is of the order of about 7.5 grams per denier.

Reference is now made to FIG. 1 of the accompanying drawing which, along with the discussion that follows, describes one arrangement of equipment to produce the high tenacity extruded vinyl fluoride polymer structures.

An extruded vinyl fluoride polymer structure 2 is extruded through an extrusion orifice 4 directly into a quench bath 6. The vinyl fluoride polymer dispersion is prepared in hopper 8 by mixing under agitation a vinyl fluoride polymer with a latent solvent therefor. The hopper is heated by an external means 10 to coalesce the vinyl fluoride polymer and latent solvent into a fluid composition. The fluid composition of coalesced vinyl fluoride polymer passes from the hopper 8 through the extruder 12 to the extrusion orifice 4. Filtering means 11 such as a fine screen or a sand filter pack is positioned between the extruder 12 and the extrusion orifice 4. Quench bath 6 is placed in close proximity to extrusion orifice 4 to prevent undue molecular orientation from tension. In the quench bath 6 the vinyl fluoride polymer extrudate is cooled therein to a temperature sufficient to solidify the structure. Guide rolls 14 direct the cooled structure having minimum orientation from the quench bath to a heating unit 16 wherein sufficient latent solvent in the vinyl fluoride polymer extrudate is evolved to permit drawing the extrudate with a sharp neck. The structure 2 is removed from the heater 16 and drawn with a neck between godets 18 and 20 by operating the second godet 20 at a peripheral speed greater than the peripheral speed of the first godet 18. The stretched structure is then passed over a godet 22 and into heating unit 24 the stretched vinyl fluoride polymer structure is heat set in heating unit 24 and removed. Godet 26 may be operated by varying peripheral speed rates to vary the tension on the drawn structure while it is subjected to the setting action of heat in heating unit 24. After heat setting the structure may then be wound up on a bobbin.

The vinyl fluoride polymer-latent solvent dispersion may be prepared by bending the vinyl fluoride polymer with latent solvent in a wide variety of mixing equipment, including Hobart mixers, Waring blenders, ball mills, colloid mills and sand grinding equipment. Feed mixtures ranging in consistency from a fluffy, free-flowing powder through heavy paste and viscous liquids to freely flowing liquids are operable in a process of this invention. An extrudable composition may be formed containing as little as 5% and up to 90% latent solvent, by weight, preferably however, the solvent concentration range is from 40% to 80%.

Suitable vinyl fluoride polymers are those having an intrinsic viscosity of at least 0.35 and preferably at least about 1. The polymer particles may range in size up to about 30 microns in diameter, preferably the diameter of the polymer particles is below about 20 microns. The size of the polymer particles may be reduced by a variety of means known in the art, such as ball milling or grinding. Although particle sizes as low as 0.005 micron may be employed, it is preferable that the size of the particle be within the range 0.05 to 5 microns. The particles in a given dispersion need not be uniform in size.

Coalescence of the vinyl fluoride polymer-latent solvent dispersion may be achieved prior to its extrusion through an orifice, for instance a spinneret or film casting hopper, in a heated hopper of conventional design wherein the dispersion and hopper are heated to a temperature effective to completely coalesce the polymer particles to form a single phase fluid composition which is fed from the hopper to an extruder and through the extrusion orifice in the form of an extrudate. Alternatively, the extruded structure may be coalesced subsequent to the formation of the structure by extruding the dispersion through the extrusion orifice and then coalescing the structure by passing it through a coalescing medium, e.g., a hot tube furnace heated with radiant heat, a hot vapor bath where the structure is heated by condensation of vapors, or a hot liquid bath where the structure is immersed after it is removed from the extrusion orifice. In the preferred practice of the present invention coalescence is achived prior to extrusion of the dispersion through the extrusion orifice.

To avoid or minimize the possibility of thermally degrading the polymer, the preferred extrusion temperature is the lowest one that is operable at a solvent concentration which permits a satisfactory throughput rate of finished extrudate of satisfactory quality. In general, the extrusion temperature may range from 120° C. to 200° C., preferably from about 135° C. to 175° C. In all instances, the preferred extrusion temperature is subject to the upper limitation of the normal boiling point of the latent solvent. The temperature in the extruder may exceed the normal boiling point of the latent solvent provided the extruded structure actually issues from the extrusion orifice at a temperature below the boiling point of the vinyl fluoride polymer-latent solvent dispersion. Although the boiling point of latent solvents useful for purposes of this invention may be as low as 100° C., in order to realize satisfactory throughput rates in the extrusion of fibers, filaments or films, the temperature of extrusion is preferably not less than 120° C., hence the more useful latent solvents will be those having boiling points above 120° C.

The latent solvent need not necessarily be a liquid at room temperature provided its melting point is not so high that the temperature necessary for liquid blending of latent solvent and polymer subjects the polymer to thermal degradation. It should be thermally stable up to its normal boiling point, or at least up to the temperature necessary to cause coalescence of polymer particles. It should not react chemically with either the polymer or the materials of construction of the process equipment over the expected temperature range, and if cooling of the extruded structure is effected in a quench bath the latent solvent should not be chemically reactive with the quench bath liquid.

Following are examples of specific compounds representative of the class of latent solvents useful in the process of the present invention: gamma butyrolactone, butadiene cyclic sulfone, tetramethylenesulfone, dimethylsulfone, hexamethylenesulfone, diallylsulfoxide, dimethylsulfoxide, dicyanobutene, adiponitrile, ethylene carbonate propylene carbonate, 1,2 - butylene carbonate, 2,3 - butylene carbonate, isobutylene carbonate, trimethylene carbonate, N,N - diethylformamide, N,N-dimethylacetamide, N,N - dimethylformamide, N,N - dimethyl - gamma - hydroxyacetamide, N,N - dimethylgamma - hydroxybutyramide, N,N - dimethylacetamide, N,N - dimethylmethoxyacetamide, N - methylacetamide, N - methylformamide, N,N - dimethylaniline, N,N - dimethylethanolamine, 2 - piperidone, N - methyl - 2 - piperidone, N - methyl - 2 - pyrrolidone, N - ethyl - 2 - pyrrolidone, N - isopropyl - 2 - pyrrolidone, 5-methyl-2 - pyrrolidone, beta - propiolactone, delta-valerolactone, gamma - valerolactone, alpha - angelicalactone, beta-angelica - lactone, epsilon - caprolactone, and alpha, beta and gamma-substituted alkyl derivatives of gramma-butyrolactone, gamma-valerolactone and delta valerolactone, as well as delta-substituted alkyl derivatives of delta-valerolactone, tetramethyl urea, 1-nitropropane, 2-nitropropane, acetonyl acetone, acetophenone, acetyl acetone, cyclohexanone, diacetone alcohol, dibutyl ketone, isophorone, mesityl oxide, methylamyl ketone, 3-methylcyclohexanone, bis-(methoxymethyl) uron, methylacetysalicylate, diethyl phosphate, dimethyl phthalate, ethyl acetoacetate, methyl benzoate, methylene diacetate, methyl salicylate, phenyl acetate, triethyl phosphate, tris(morpholino) phosphine oxide, N-acetylmorpholine, N-acetylpiperidine, isoquinoline, quinoline, pyridine and tris(dimethylamido) phosphate.

Exemplary of vinyl fluoride polymers which may be employed are the homopolymers of vinyl fluoride and copolymers of vinyl fluoride with other monoethylenically unsaturated monomers, copolymerizable therewith, wherein the vinyl fluoride is present in substantial or in major amounts, i.e., at least 75 to 80% of the total, by weight. Examples are monoethylenic hydrocarbons, e.g., ethylene, propylene, isobutylene and styrene; halogen-substituted mono-ethylenic hydrocarbons, e.g., vinyl chloride, vinyl bromide, 1,1-dichloroethylene, 1,1-difluoroethylene, difluorochloroethylene, trifluorochloroethylene, tetrachloroethylene, trifluoropropylene, difluoroisobutylene; vinyl esters, e.g., vinyl formate, vinyl acetate, vinyl propionate, vinyl butyrate, vinyl benzoate, vinyl pivalate, vinyl stearate, vinyl salicylate and vinyl esters of inorganic acids; vinyl ethers, e.g., vinyl ethyl ether, tetrafluoroethyl allyl ether and vinyl dioxolane; vinyl ketones, e.g., methyl vinyl ketone; N-vinyl imides, e.g., N-vinyl succinimide and N-vinyl phthalimide; acrylic and methacrylic acids and their derivatives, e.g., esters, nitriles, amides, anhydrides and acid halides, including methyl methacrylate, beta-hydroxyethyl methacrylate, allyl methacrylate, acrylonitrile, N-butyl methacrylamide, etc.; derivatives of maleic and fumaric acids, e.g., diethylmaleate and dimethylfumarate; propenyl esters; e.g., allyl acetate, isopropenyl acetate, etc. The presence in these copolymers of even a small percentage of a comonomer which, as a homopolymer, is normally more soluble in the selected latent solvent than is the homopolymer of vinyl fluoride, may render said copolymer sufficiently more soluble in aforementioned latent solvent as to permit its extrusion from feed mixtures containing considerably less solvent than is needed in the extrusion of homopolymers of vinyl fluoride.

Depending upon the ultimate end use for which the fibers, filaments or films are to be utilized, the process of the present invention provides a method wherein a variety of vinyl fluoride polymeric structures may be produced characterized by various tensile strengths. For example, for some typical textile fibers the tensile strength of the fibers used are within the range of about 3 to 5 grams per denier. Further, if industrial fibers were warranted such as those used in tow ropes, industrial cordage, papermakers dryer felts, awnings, tarpaulins, fish netting, tobacco cloth, filter cloths, tire cord, automobile convertible tops and seat covers, and inflatible structures, high tensile strength fibers are required. Tough, flexible, high tenacity polyvinyl fluoride films having many uses can also be produced by the method disclosed hereinabove. Accordingly, depending on the particular use for which one desires, the process of the present invention is capable of producing polyvinyl fluoride extruded structures characterized by tensile strengths in excess of 3 grams per denier.

In order that those skilled in the art may more completely understand the present invention and the preferred method by which the same may be carried into effect the following specific examples are offered:

EXAMPLE I

Into a three-liter kettle fitted with an agitator is added polyvinyl fluoride, having an intrinsic viscosity of 1.25, and dimethylformamide. The mixture is continually stirred and heated to a maximum temperature of 160° C. The resulting mixture of polyvinyl fluoride and dimethylformamide upon standing for ½ hour at 140° C., to allow vapor and air bubbles to rise, gives a clear pale yellow solution. The polymer solids amount to 19%. This solution is metered by a size ½ Zenith pump through a spinneret having a 45 x 68 mill monofilament orifice. The spinning head temperature is 125° C. Air pressure is maintained at 20 lbs. per square inch. Two 80-mesh and one 200-mesh screens serve as filters between the metering pump and the spinneret. The coalesced polyvinyl fluoridedimethylformamide solution is extruded through the spinneret orifice into a water quench bath located in a vertical direction one inch below the orifice (air gap between water level and orifice is one inch). The filament is collected on a godet at a rate of 30 ft. per minute. The monofil is removed from the quench bath and drawn over a 2 ft. hot plate at temperatures of 55° C. and 82° C., respectively. The results are reported in Table 1.

TABLE 1

| Treatment | Denier | Draw Ratio | Tenacity, grams per denier | Rupture Elongation, percent |
|---|---|---|---|---|
| Undrawn | 259 | | 0.185 | 210 |
| Drawn at 55° C | 75.5 | 3.4 | 1.06 | 14 |
| Drawn at 82° C | 66.6 | 3.9 | 1.66 | 14 |

EXAMPLE II

A 40% slurry of polyvinyl fluoride, having an inherent viscosity of 1.25 in dimethylformamide is prepared in a hopper and continuously agitated. The slurry is passed through a screw extruder having a length of 16 inches and a diameter of 1 inch. The rear 12 inches of the screw is flighted and the front 4 inches being a smooth torpedo or smear head. The temperature profile of the extruder varies from 105° C. to 188° C. The polyvinyl fluoride-dimethylformamide slurry is filtered through two 200-mesh and one 40-mesh screens and extruded through a 45-mil spinneret orifice. The slurry is passed to the extruder through a size ½ Zenith pump operated at a pumping speed of 4.5 cc. per minute. The screw speed of the extruder is 14 revolutions per minute. The take-up speed is 54 ft. per minute. The filament is extruded into a water quench bath, placed 6 inches below the spinneret orifice. The bath temperature is 75° F. The filament is removed from the quench bath on a set of godet rolls and collected on a Leesona winder and drawn on a continuous draw frame over a 2-foot long hot plate held at a temperature of 149° C. The filament is drawn at a draw ratio of 2.36. The results are reported in Table 2.

TABLE 2

| Treatment | Denier | Tenacity, grams per denier | Rupture Elongation, percent |
|---|---|---|---|
| Undrawn | 1469 | 0.132 | 114 |
| Drawn | 576 | 0.37 | 33.6 |

EXAMPLE III

Example II is repeated except that the monofil is run directly into the water quench tank and ¾ of an inch of 60–80 fired sand is employed as part of the filter. The monofilament is removed from the quench tank after ½ hour residence time and allowed to stand overnight in air before it is placed in an air oven at 135° C. for ½ hour. The filament is then drawn with a sharp neck having a draw ratio of 9. The drawing is conducted over a hot plate at 149° C. This filament possesses a tenacity of 5.54 grams per denier with a rupture elongation of 17%.

EXAMPLE IV

Example III is repeated except that the water level of the quench tank is 2¼ inches from the spinneret orifice. The collected monofil is dried in an air oven at 135° C. for one hour and then drawn with a neck having a natural draw ratio of 9. The drawing is conducted in a steam chamber and over a hot pin at 132° C. on a continuous draw frame. This filament possesses a tenacity of 3.78 grams per denier with a rupture elongation of 11.6%.

EXAMPLE V

A slurry prepared by the method of Example II containing 40% polyvinyl fluoride, having an inherent viscosity of 1.25, and 60% dimethylformamide is fed through the size ½ Zenith pump at a rate of 3.3 cc. per minute to the extruder, described in Example II, operated at a screw speed of 16 revolutions per minute. A heated filter pack assembly is employed and placed immediately over the spinneret orifices. The filter pack comprises one 40-mesh and two 200-mesh screens. The filament is spun into air at ambient temperatures (25° C.). The take-up velocity at the godet is 16 feet per minute. The filaments broke in the line at this take-up velocity.

EXAMPLE VI

Example V is repeated except that a slurry containing 35% polyvinyl fluoride, having an inherent viscosity of 1.25, and 65% dimethylformamide is filtered through two 40 x 200 bound screens and a 300-mesh screen, and spun into a heated stack (45° C.) through a 34 hole, 12 x 18 spinneret. The temperature profile of the extruder varies from 140° C. to 153° C. and operates at a screw speed of 44 revolutions per minute and a spinning pressure of 100–150 p.s.i. The take-up speed is 47 ft. per minute. None of the filaments possesses tenacities greater than 2 grams per denier.

EXAMPLE VII

A slurry containing 35% polyvinyl fluoride, having an inherent viscosity of 1.25, and 65% N-methyl pyrrolidone is passed through the extruder described in Example II through a filter pack placed directly against the spinneret. The filter pack comprises four 200-mesh and four 40-mesh screens. The spinneret has thirty-four 9 x 12 mil orifices. The slurry is fed through the size ½ Zenith pump at a throughput rate of 1.65 cc. per minute to the extruder, described in Example II, operated at a screw speed of 44 revolutions per minute and a spinning pressure of 150 lbs. per square inch. The temperature profile of the extruder varies between 143° C. and 171° C. Certain of the filaments are taken up under gravity fall, others at take-up rates of 10, 20 and 25 ft. per minute, while the remaining filaments are extruded into a water quench bath held about 6 inches below the spinneret orifices. The filaments are washed in water, dried at 135° C. for 15 minutes and drawn with a neck over a hot plate at 132° C. The results are reported in Table 3.

TABLE 3

| Take-up Conditions | Denier Undrawn | Denier Drawn | Draw Ratio | Tenacity, grams per denier | Rupture Elongation, percent |
|---|---|---|---|---|---|
| In water | 529 | 47.0 | 11.3 | 6.15 | 8.5 |
| Gravity Fall | 211 | 29.2 | 7.2 | 3.24 | 8.4 |
| 10 ft. per min | 77.5 | 21.0 | 3.7 | 1.84 | 7.4 |
| 20 ft. per min | 34.0 | 11.6 | 3.2 | 1.65 | 6.0 |
| 25 ft. per min | 24.2 | 14.3 | 1.7 | 0.97 | 7.5 |

EXAMPLE VIII

A slurry containing 33% polyvinyl fluoride, having an inherent viscosity of 1.25, and 67% N-methyl pyrrolidone is extruded using a 22-hole, 15 x 15 mil spinneret and a filter pack placed against the spinneret. The filter pack comprises two 40-mesh screens, one 200-mesh screen, 16 ml. of 100–150 mesh sand and a 40-mesh screen on top of the sand. The temperature profile of the extruder varies from 107° to 179° C. The slurry is fed through the size ½ Zenith pump at a throughput rate of 10.2 cc. per minute to the extruder, described in Example II, operated at a screw speed of 29 revolutions per minute and a spinning pressure in the range of 1200 to 1500 lbs. per square inch. The filament is spun into a water quench bath which is held about 2¼ inches from the spinneret face. The filament is removed from the quench bath and dried for ½ hour at 135° C. in an air oven. Essentially all of the latent solvent is removed and the filaments are drawn with a sharp neck on a continuous draw frame at 143° C. with a draw ratio of 8. The filaments have a tenacity of 5.54 grams per denier with a rupture elongation of 8.1% and an initial modulus of 75 grams per denier. The elastic recovery of this polyvinyl fluoride filament after 5 cycles is 85%. The stretched fluoride filament is then held at a fixed length under tension between two godets and subjected to a temperature of 175° C. for 5 minutes. The resultant polyvinyl fluoride filament possesses a tensile strength of 10 grams per denier with a rupture elongation of 22%.

EXAMPLE IX

Example VIII is repeated except that the stretched polyvinyl fluoride filament is not held under tension and allowed to relax. The relaxed filament is then heated for 5 minutes at 175° C. The resultant polyvinyl fluoride filament has a tensile strength of 7.5 grams per denier with a rupture elongation of 42%.

While there have been described specific embodiments of the present invention, the examples are not intended to be understood as limiting the scope of the invention and It is claimed:
1. A process for the preparation of extruded structures from a vinyl fluoride polymer which comprises the following steps in sequence;
   (a) forming a coalesced extrudate which is a mixture of vinyl fluoride polymer and a latent solvent therefor,
   (b) quenching the extrudate to prevent significant orientation of its molecular chain structure,
   (c) removing, without further significant molecular orientation, a sufficient quantity of latent solvent from the extrudate to permit drawing of the extrudate with a sharp neck,
   (d) drawing said extrudate with a sharp neck,
   (e) setting the drawn extrudate.
2. A process as in claim 1 wherein the vinyl fluoride polymer is a polyvinyl fluoride having an intrinsic viscosity of at least 0.35 and a particle size of less than 30 microns and is present within a range from 10–95 percent, by weight, of the mixture of polyvinyl fluoride and latent solvent.
3. A process as in claim 1 wherein the latent solvent is removed from the extrudate by heating to a temperature within the range of 120° to 190° C.
4. A process as in claim 1 wherein the extrudate drawn with a sharp neck has a draw ratio of at least 5-fold.
5. A process as in claim 1 wherein the extrudate is set by heat while held at a constant length under tension.
6. A process as in claim 1 wherein the extrudate is set by heat without the application of tension.
7. A process as in claim 1 wherein the extrudate is quenched in a quench bath maintained at a temperature of less than 100° C.

References Cited

UNITED STATES PATENTS

| | | | |
|---|---|---|---|
| 3,236,825 | 2/1966 | Gord. | |
| 2,419,010 | 4/1947 | Coffman et al. | 260—92.1 |
| 2,810,702 | 10/1957 | Bechtold et al. | 264—205 |
| 2,824,780 | 2/1958 | Satterthwaite. | |
| 2,953,818 | 9/1960 | Bartron | 264—178 |
| 3,139,470 | 6/1964 | Prengle et al. | 264—210 |

DONALD J. ARNOLD, Primary Examiner

U.S. Cl. X.R.

264—176, 178, 205